UNITED STATES PATENT OFFICE.

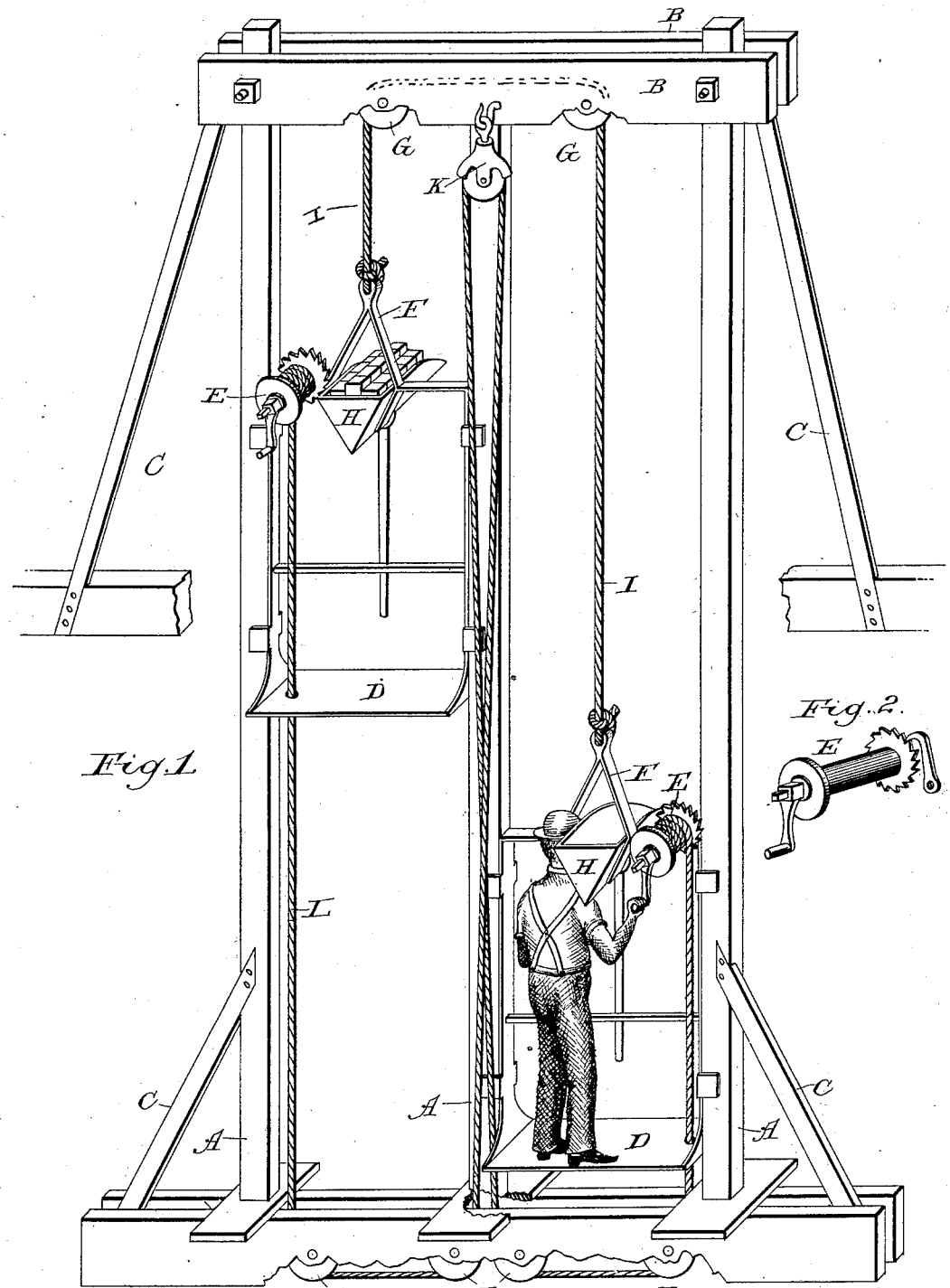

PHILIP CURIDEN HARLAN, OF ALLEGHENY, PENNSYLVANIA.

HOD-ELEVATOR.

SPECIFICATION forming part of Letters Patent No. 360,587, dated April 5, 1887.

Application filed May 8, 1886. Serial No. 201,593. (No model.)

*To all whom it may concern:*

Be it known that I, PHILIP CURIDEN HARLAN, a citizen of the United States, residing at Allegheny, county of Allegheny, and State of Pennsylvania, have invented new and useful Improvements in Hoisting-Machines; and I do hereby declare that the following is a full, clear, and exact description of the same, reference being had to the annexed drawings, making part of this specification, and to the letters and figures marked thereon.

My invention relates to counterbalance hoisting-machines in which the operator's weight and strength combined on a descending carriage furnish the motive power for an ascending weight or matter to be hoisted, and is particularly adapted to hoisting brick, mortar, and other matter to the upper part of a building in course of erection; and the object of my improvement is to provide a continuous brake or check rope connecting both carriages together, so that any power or friction brought to bear on one will act directly on the opposite carriage, by which means the operator can control the speed of the descending carriage in case his weight is greater than the weight placed upon the ascending carriage, and to afford the means of bringing the carriages in motion should his weight not be sufficient to start the opposite carriage. A continuously-traveling brake or check rope traveling in the same direction with the carriages affords the operator more full control, as it causes less friction on the hands than if such a rope were stationary or running in an opposite direction.

I attain the object of my invention by the mechanism illustrated in the accompanying drawings, in which—

Figure 1 is a representation of the entire machine. Fig. 2 is a detail showing a drum, upon which the brake or check rope is wound by means of a crank or lever.

A A A are wooden standards serving as guides upon which the carriages ascend and descend; or, in place of wooden standards, rope or wire rope may be used as guides.

B B are beams or pieces of plank to hold the tops of the standards in position and afford a bearing for the wheels upon which the supporting-rope operates.

C C C C are braces to support and hold the machine in its proper position.

D D are the carriages or platforms of the machine.

E E (see Fig. 2) are drums upon which the surplus of the brake or check rope is coiled, and serve as friction-brakes to lock the machine. Both drums being connected together by the same rope, any power applied to one acts upon the other.

F F are iron bands serving for the purpose of supporting the hods and for attaching the hoisting-rope that supports the carriages.

G G are grooved wheels upon which the supporting or hoisting rope runs.

H H are the hods.

I is the supporting or hoisting rope.

J J J J are grooved pulley-wheels upon which the brake or check rope passes over.

K is a grooved wheel secured to the cross-beams B by means of a bolt or hook. This wheel is provided with a swivel, in order that it may be turned around for the purpose of crossing the brake or check rope.

L is a continuous brake or check rope connecting both carriages together, and by which means the operator can counterbalance unequal weights of the carriages by applying his own power, as by pulling upward his power applies friction to the machine. One advantage of the rope is that it travels just as fast and in the same direction with the carriages, and there is no friction on the hands of the operator, and, in connection with the drums E E, forms a complete friction-lock for the hod-cars.

The manner of operating the machine is as follows: The operator first places a loaded hod on any of the empty carriages, and then ascends a ladder placed in any convenient position. Arriving at the top, he first takes hold of the brake or check rope, then steps on the empty carriage. Arriving at the bottom, he then locks the carriages by means of the drum E and its pawl and ratchet, to prevent the loaded carriage at the top from descending. He then places a loaded hod on the empty carriage at the bottom, and once more ascends the ladder and removes the loaded hod at the top. When the weight of the operator is slightly too heavy for the ascending weight, the speed can be checked by pulling slightly upward on the brake or check rope. When the loaded carriage is slightly too heavy for the weight of the operator, the hod-cars can be brought in motion by pulling downward on the brake or check rope.

This machine can be operated by one or more persons when necessary. When operated by two persons, they may ascend the ladder alternately, and as the one removes the loaded hod at the top the other may place a loaded hod on the empty carriage at the bottom.

Having described this invention and its manner of operation, what I desire to claim and secure by Letters Patent is—

A brake or check device for hod-elevators, comprising windlasses mounted upon each elevator-car, a check-rope connected at one end to one of said windlasses and passed through the bottom of one car to the lower part of the supporting-standard, thence to the top of the standard, thence to the lower part of the standard, and thence to the windlass on the other car, and suitable guide-pulleys at the bottom of the standard and pulley K at the top thereof, all substantially as described.

PHILIP CURIDEN HARLAN.

Witnesses:
H. HUNNESHAGEN,
C. J. HEIDMEYER.